(No Model.)
H. E. WALLIS.
SHIFTING ATTACHMENT FOR VEHICLE SHAFTS.
No. 372,394. Patented Nov. 1, 1887.
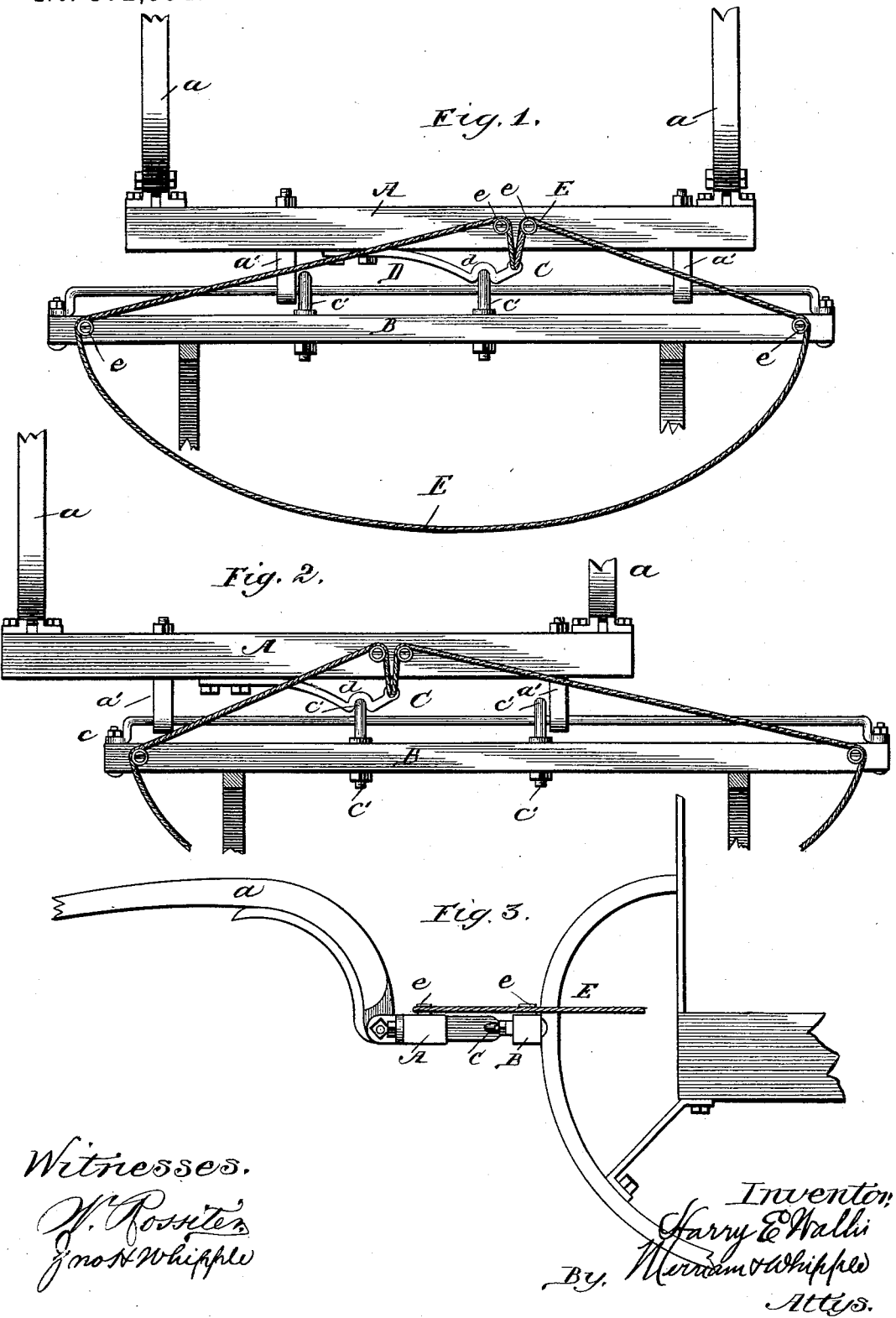
Witnesses.
W. Rossiter
Jno. H. Whipple
Inventor,
Harry E. Wallis
By Merriam & Whipple
Attys.

United States Patent Office.

HARRY E. WALLIS, OF JANESVILLE, WISCONSIN, ASSIGNOR TO GORTON W. NICHOLS, OF CHICAGO, ILLINOIS, AND THE BOWER CITY MACHINE COMPANY, OF JANESVILLE, WISCONSIN.

SHIFTING ATTACHMENT FOR VEHICLE-SHAFTS.

SPECIFICATION forming part of Letters Patent No. 372,394, dated November 1, 1887.

Application filed November 2, 1886. Serial No. 217,782. (No model.)

*To all whom it may concern:*

Be it known that I, HARRY E. WALLIS, of Janesville, in the State of Wisconsin, have invented a certain new and useful Shifting and Locking Attachment for the Shafts of Vehicles, of which the following is a specification.

The invention relates to one-horse vehicles, and the object is to provide therefor a shifting and locking attachment, whereby the shafts may be released and changed in position from center draft to side draft, or vice versa, and locked again in position by the person driving without stopping or alighting, so that the horse will be directly in front when traveling in a broad even roadway, as in cities, or sufficiently to one side to follow in one path of a two-path roadway, as in the country. I attain the object by the means illustrated in the accompanying drawings, in which—

Figure 1 represents a top view of the attachment as applied to a cutter or sleigh, the shafts being in position for center draft. Fig. 2 represents the same, the shafts being in position for side draft. Fig. 3 is a side view.

A designates the cross or back bar of the shafts *a*.

B is the cross-bar of the cutter. This bar is provided with a rod, C, which is attached to the bar by screw-bolts *c* at the ends and eyebolts *c'* near the central portion, which serve as stays to the rod, and also answer the purpose of lugs or stops, as hereinafter explained.

The cross or back bar, A, of the shafts is connected to the rod C by eyebolts *a'*, the eyes of which slide on the rod between the ends and the points where the eyebolts *c'* are located.

A spring-latch, D, is attached to the bar A and extends backward, so as to come in contact with the eyebolts or stops *c'*, and is provided with a notch or short curve at *d*, arranged to spring into engagement with the forward end of the eyebolts, operating as stops. A hole is made in the end of the spring-latch, through which a cord, E, is attached and passed over rollers *e e* on the bar A B, and extended back into the cutter-box, near the feet, and within reach of a person occupying the front seat thereof, the arrangement being such that by pulling on the cord in one direction, as indicated by the arrow, Fig. 1, the spring will be loosed from the eyebolt to which it is caught and the shafts caused to slide over to one side to the position shown in Fig. 2, in which it will be stopped by one of the stops *c'* and locked on the other by the spring engaging therewith. Pulling the cord in the opposite direction in like manner releases the spring-latch and returns the shafts to the central position, in which they are again locked by the latch engaging the other stop. The attachment of the spring-latch to the bar A, so that it may move therewith, is essential, in order that the cord may effect both the unlocking and the shifting and relocking of the shafts in the manner described.

Having thus fully described my invention, what I claim, and desire to secure by Letters Patent, is—

The combination, with the sliding bar A, provided with eyebolts *a' a'*, and spring-latch D, having a notch, *d*, of the stationary bar B, provided with rod C and stops *c' c'*, and the cord E, connected to said spring-latch and to said bars A B and extended into the front of the vehicle-box, substantially as specified.

HARRY E. WALLIS.

Witnesses:
WILLIAM STREET,
HENRY S. LUGG.